United States Patent [19]

Clarke

[11] Patent Number: 4,496,314

[45] Date of Patent: Jan. 29, 1985

[54] RECUPERATOR

[76] Inventor: Beresford N Clarke, 3723 W. Hamilton Rd., Fort Wayne, Ind. 46819

[21] Appl. No.: 470,213

[22] Filed: Feb. 28, 1983

[51] Int. Cl.³ .................. F27B 5/14; F23D 11/44; F24C 3/00

[52] U.S. Cl. .................. 432/29; 126/91 A; 431/215; 432/209

[58] Field of Search .............. 432/209, 29; 126/91 A; 431/215

[56] References Cited

U.S. PATENT DOCUMENTS

| | | | |
|---|---|---|---|
| 2,410,881 | 11/1946 | Hunter | 126/91 A |
| 2,638,889 | 5/1953 | Dow | 126/91 A |
| 3,079,910 | 3/1963 | Bloom et al. | 126/91 A |
| 3,828,762 | 8/1974 | Duzey | 126/91 A |

Primary Examiner—John J. Camby
Attorney, Agent, or Firm—George A. Gust

[57] ABSTRACT

An improvement in negative pressure radiant tube type fuel burner systems in disclosed wherein a heat recuperator in the form of a U-shaped conduit for conveying air from the atmosphere to a burner unit extends inwardly into the exhaust leg of the radiant tube so that combustion air for the burner is diverted along generally parallel oppositely directed paths into and out of the radiant tube to transfer heat from exhaust gas to intake air. The recuperator is made to be free floating within the radiant tube so as to minimize the chance of structural damage due to thermal expansion and a series of baffles may be employed in conjunction with the recuperator to both increase heat transfer to incoming air and to diminish radiant heat loss from the radiant tube.

18 Claims, 6 Drawing Figures

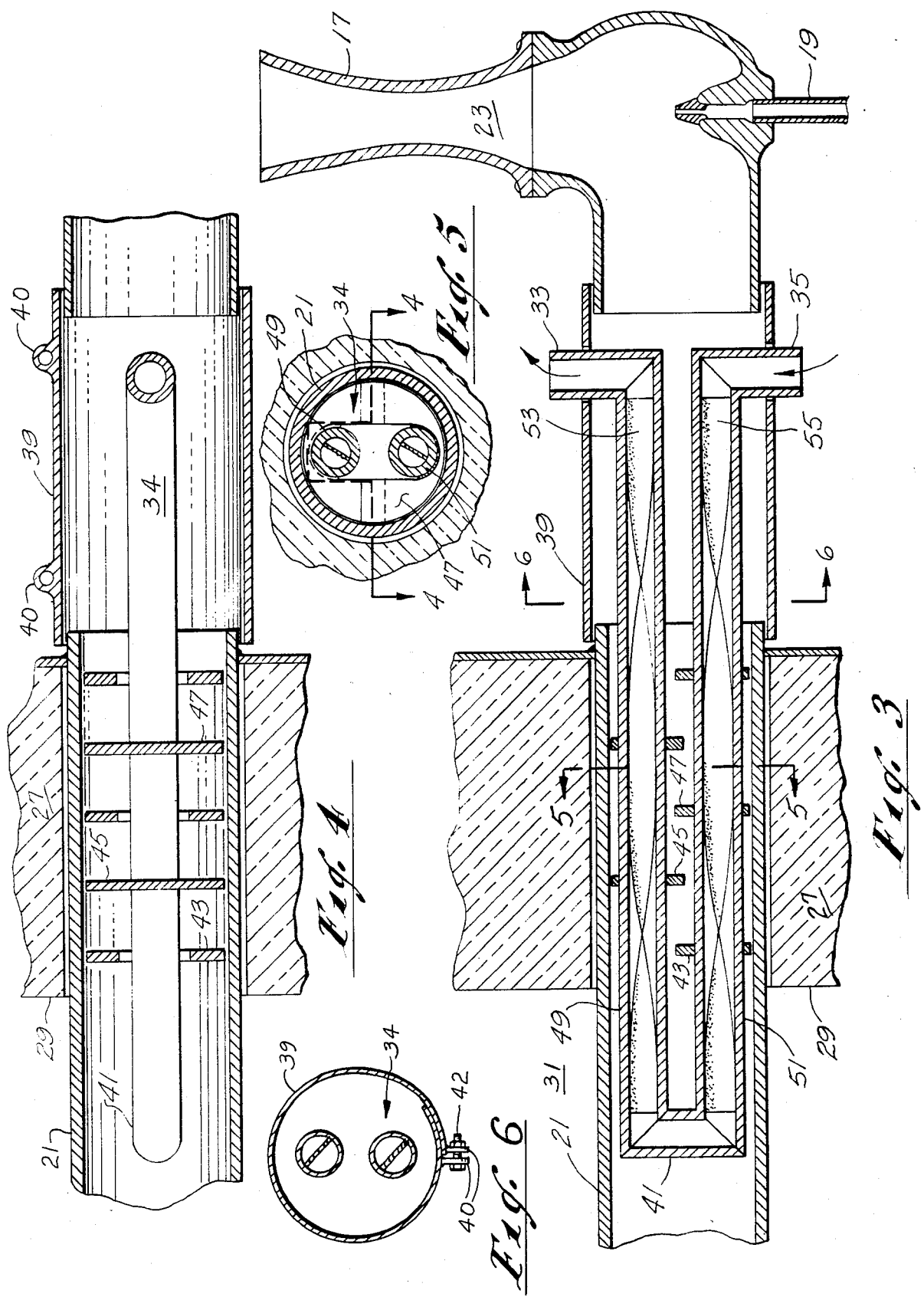

RECUPERATOR

BACKGROUND OF THE INVENTION

1. Field of the Invention

The present invention relates generally to fuel fired furnaces and improvements in the operating efficiency of such furnaces and more particularly to improvements in radiant tube type fuel burner systems.

2. Description of the Prior Art

Radiant tube type fuel burner systems are well known in the art and are frequently employed, for example, in a heat treating furnace or annealing oven and in other processes where it is desired to segregate the combustion region from the region occupied by the product being treated. Frequently, the desire or goal is to avoid deleterious effects on the product by the combustion gases. A common way to accomplish this goal is to provide a so-called radiant tube having a burner unit near one end of the tube and an exhaust gas outlet at the other tube end with the tube being U-shaped or otherwise configured so as to pass into and out of a furnace. Thus, combustion flame propagates along the tube while being isolated from the furnace environment by the tube with this combustion heating the tube sidewalls and therefore also the furnace area.

It is also common practice to operate such radiant tube type fuel burner systems as negative pressure systems so as to avoid contaminating the product being treated in the furnace in the event that a leak occurs in the radiant tube. In other words, some scheme is employed to maintain the pressure within the radiant tube at or below the pressure within the product area of the furnace so that if the leak does occur product area atmosphere passes into the tube to be exhausted with the combustion products rather than combustion products leaking into the product area of the furnace. One scheme for achieving this negative pressure operation is to employ an eductor on the exhaust leg of the tube. Such an eductor is a Venturi-type device in the exhaust outlet receiving a stream of compressed air and thereby reducing the pressure in the exhaust system of the tube. With such an eductor, air is drawn into the firing leg of the tube due to this reduced pressure to be mixed with the gas supplied to the burner unit. When such a system is not burning, natural convection currents cause air to flow through the radiant tube undesirably cooling the tube and reducing overall furnace efficiency. Such a system also has radiation losses through both the firing and exhaust legs of the tube further reducing furnace efficiency.

It is also a common technique in a wide variety of combustion devices to attempt to harness the energy lost through the exhaust system when it expels high temperature exhaust gases. Since most combustion devices must heat the air of the incoming combustible fuel air mixture, a frequent technique is to employ a so-called recuperator which transfers heat from exhaust gases to incoming air to warm that air somewhat and reduce the fuel consumed in raising the intake air to its final temperature in the combustion process. A recent attempt to employ heat recuperative techniques in a radiant tube type fuel burner system is illustrated in U.S. Pat. No. 4,310,303. This patented arrangement suffers from several defects insofar as operating efficiency is concerned and also loses the exhaust gas isolating advantage of negative pressure systems by operating in a positive pressure mode where the input combustion air and input fuel are introduced into the tube at pressures exceeding the furnace environment pressure. Other prior patents include U.S. Pat. Nos. 2,841,383; 3,446,277; 3,814,174; 4,106,556; 4,222,824; 4,269,266 and 4,310,303; and Japanese Pat. No. 52-57551.

SUMMARY OF THE INVENTION

Among the several objects of the present invention may be noted the retention of the advantages of the several above discussed systems without their associated drawbacks; achieving an overall improvement in the efficiency of radiant tube type burners; the provision of an improved and negative pressure radiant tube type fuel burner system having a burner unit in the firing leg and a heat recuperator in the exhaust leg; the provision of a heat recuperator which avoids the problems of temperature differential induced distortions; the provision of a radiant tube type fuel burner having reduced radiation heat loss; the provision of a radiant tube type fuel burner having reduced convection heat loss; the provision of a compact high efficiency heat exchanger for preheating combustion air; the provision of a heat exchanger having heat transfer enhancing baffles; and the provision of a heat exchanger having heat transfer enhancing helically twisted strips lying along the path of the heat receiving medium. These, as well as other objects and advantageous features of the present invention, will be in part apparent and in part pointed out hereinafter.

In general, heat loss from a radiant tube type fuel burner system is reduced by transferring heat from exhaust gas flowing in the exhaust leg of the tube to combustion air being introduced into the firing leg of the tube and by blocking radiation heat loss from the system through the tube ends. Restricting air movement through the tube whenever a flame is not present in the tube further enhances the efficiency of the system.

Also in general and in one form of the invention a negative pressure type radiant tube fuel burning system has an eductor near the tube exhaust end for extracting exhaust gas and maintaining the pressure within the tube below ambient pressure and includes a heat recuperator exposed to the exhaust gas flow within the tube between the tube burner and eductor assembly to extract heat from the exhaust gas and heat air to be supplied to the burner. The portion of the heat recuperator exposed to exhaust gas flow may be formed as a U-shaped conduit through which the air to be supplied to the burner flows along generally parallel oppositely directed paths with that U-shaped conduit portion being disposed within the radiant tube near the eductor end thereof.

BRIEF DESCRIPTION OF THE DRAWINGS

FIG. 3 is a longitudinal-sectional view of a portion of the modified system of FIG. 2;

FIG. 4 is another longitudinal-sectional view of essentially the same portion as FIG. 3 but rotated ninety degrees (90°).

FIG. 5 is a cross-section along section line 5—5 of FIG. 3; and

FIG. 6 is a cross-section taken substantially along section line 6—6 of FIG. 3

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
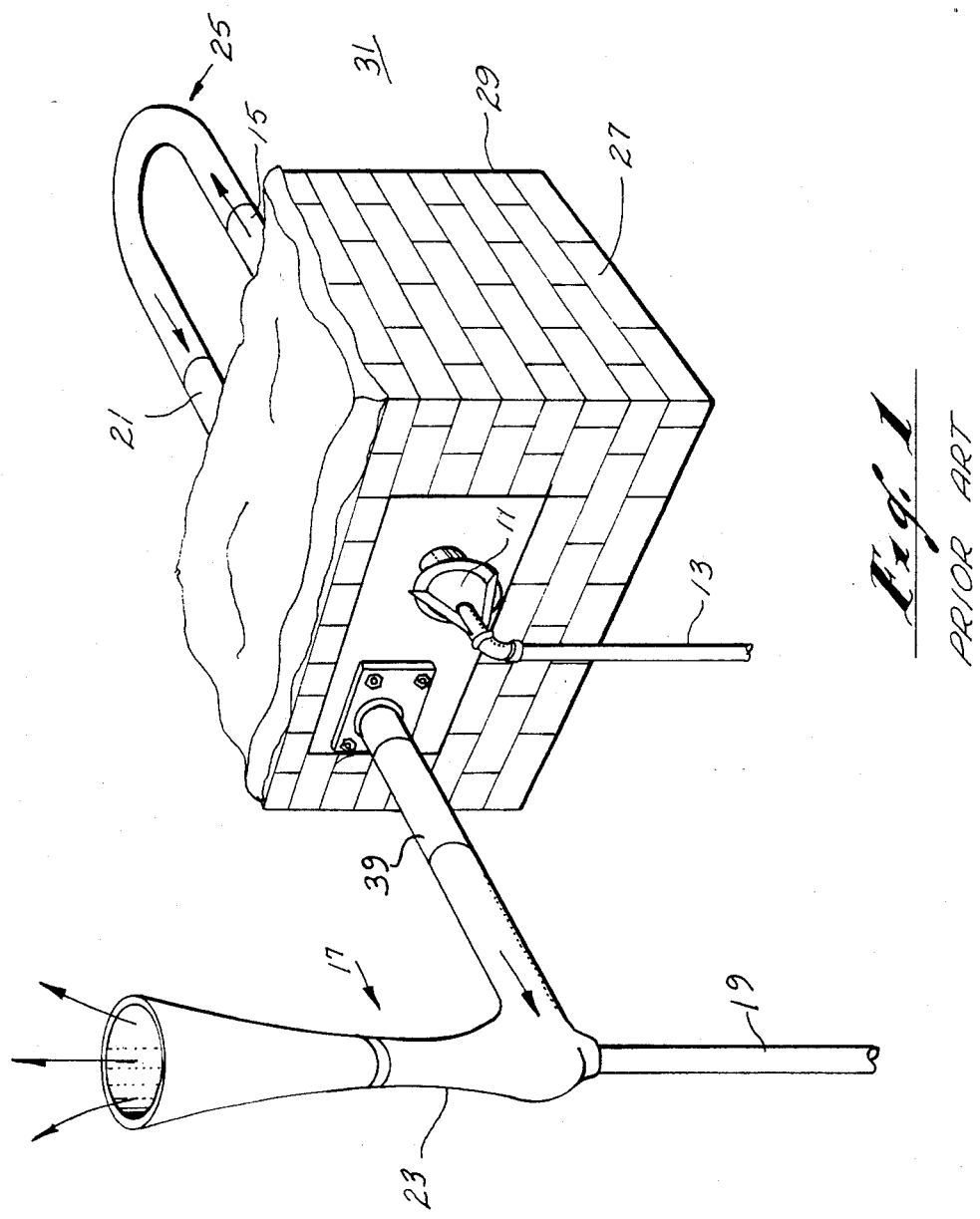
FIG. 1 is a simplified perspective view of a radiant tube type fuel burner system of known prior designs.

Referring first to FIG. 1, there is illustrated a negative pressure radiant tube type fuel burner system having a burner unit 11 near the open end of the tube which introduces gas from gas line 13 as well as allowing air to pass into the tube so that a combustible fuel air mixture is introduced into the firing leg 15 of the tube. An eductor 17 receiving compressed air from line 19 is coupled to the exhaust leg 21 of the tube so that the compressed air flowing through a restricted Venturi region 23 of the eductor 17 creates a vacuum on exhaust leg 21 and firing leg 15 so that fresh air is drawn into the region of the burner unit 11 through openings in the tube end. Thus, the eductor 17 functions to extract exhaust gas from the tube while maintaining pressure within the tube below the ambient pressure. Under the circumstances, should a leak occur in the radiant tube, gases in the surround will be drawn into the tube rather than gases within the tube escaping to the surrounding area.

The radiant tube 25 may take on many different shapes but is illustrated as being generally U-shaped and extending through a furnace wall 27 with a substantial portion of the tube positioned inside the interior surface 29 of the wall and within a furnace chamber 31. The furnace interior 31 may represent a metal heat treating furnace such as, for example, an annealing oven where it is desirable to avoid contact between the product being treated and the combustion by-products. The use of a negative pressure radiant tube heating system is well suited to such furnaces because, as noted earlier, leaks in the radiant tube result in product environment atmosphere being extracted from the region 31 rather than combustion gases being introduced into that region and deleteriously effecting the product being treated.

In operation the burner unit 11, of the conventional open type, introduces a stream of natural gas, typically methane, into the burner end of the radiant tube 25 and one or more pilot lights or spark ignition systems ignite the stream of as as it flows into the tube in a laminar flow manner. The stream of gas is on the order of ¾ of an inch in diameter and is surrounded by an envelope of air also flowing into the end of the burner 11. Typically, the radiant tube is on the order of 4 to 6 inches in diameter and the open spaces, typically an open grid arrangement supporting the pilot and gas inlet, allow air to enter the tube and burner 11. This laminar flowing airgas stream burns in a very long diffusion type flame along a substantial length of the tube 25 heating the walls thereof as it passes through. The burner gas as it is introduced into the system is at a very slight positive relative pressure on the order of 4 to 12 ounces per square inch and the air flowing into the burner end of the tube because of the action of the eductor or aspirator 17 at the exhaust end of the tube results in a slight relatively negative pressure within the system.

In order to obtain proper complete combustion, a specific air-gas ratio is established by regulating the gas pressure in line 13 and then using a fixed orifice in burner unit 11. Air flow entering the burner end is controlled by selecting the proper size metering orifice or hole in the air jet inlet to the Venturi since the air supply in line 19 is typically at a constant pressure.

A batch processing furnace would be one example where the system thus far described might be used. In such furnaces the temperature is varied between around 1000° and 1750° F. and may be cycled through that range 8 or 10 times per day. Temperature control is by thermostatic control of the duty cycle of the burner. Thus, to maintain the temperature around 1000° F. in such a furnace, the burner might be on around 20% of the time, while at the high end of the temperature range, the burner would be operating nearly continuously. The amount of combustion air introduced into the open end of the tube will vary with the temperature of the radiant tube 25, hence the optimum air-gas mixture is not achieved at all operating temperatures and inefficient burner operation results. Since the radiant tube 25 is open at the end near the burner 11, there is some heat loss from the furnace due to radiation out through this open end. Since exhaust leg 21 of the radiant tube 25 is unobstructed, there is similar radiant heat loss in the direction of eductor 17, which is of course located outside the furnace wall 27. There is also, of course, the heat loss associated with the hot exhaust gases emanating from the end of exhaust leg 21.

There is yet another aspect of inefficiency associated with the arrangement of FIG. 1. With the system not burning, that is gas supply line 13 is shut and the air supply 19 is shut, the system has an opening near burner 11 with another opening at the outlet of the eductor and there is a continuous air flow from the one opening to the other with the system functioning somewhat like a smokestack and this air flow through the radiant tube 25 undesirably cools the radiant tube and furnace area.

Each of these inefficient aspects of the burner arrangement of FIG. 1 is attacked and significantly reduced with the burner arrangement of the present invention illustrated in FIGS. 2 through 5 wherein previously discussed conventional elements bear the same reference numerals as in FIG. 1.

Figure 2:
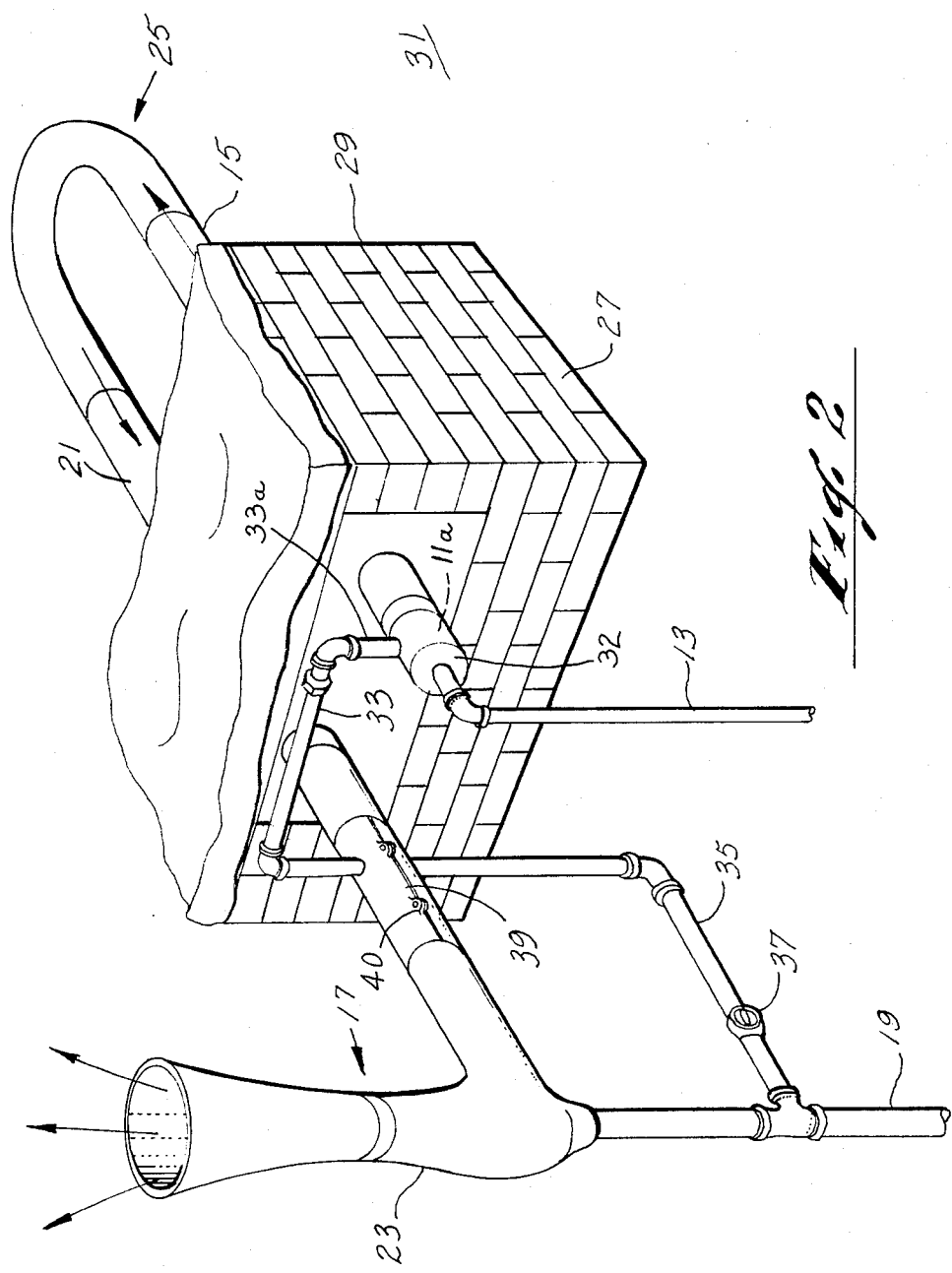
FIG. 2 is a view of the system of FIG. 1 modified in accordance with the techniques of the present invention.

In external appearance the burner system of FIG. 2 differs from that of FIG. 1 in that there is a pipe 33 spanning the two legs of the U-shaped radiant tube as well as a pipe 35 with in-line control valve 37 coupled from the pressurized air source line 19 and leading through the wall of the exhaust end of the radiant tube to be connected to a recuperator described hereafter. Pipes 33 and 35 form part of an air intake passageway for supplying pressurized air from the atmosphere to the burner unit 11a which is of the closed type. This air intake passageway also includes a U-shaped conduit portion 34 within the draw band 39 and extending inwardly into the exhaust end of the radiant tube 25. Thus, there need be no opening in the radiant tube in the region of the burner unit 11a for air admission purposes and the end of the radiant tube may be closed preferably by a disc-shaped plate 32 of stainless steel or other radiant energy reflecting surface, disposed at right angles to the axis of leg 15 of tube 25 so as to diminish the radiant energy loss through the open tube end of FIG. 1. The details of the U-shaped conduit portion 34 which couples pipes 35 and 33 together is best seen in FIG. 3.

Draw band 39 is made of a strip of stainless steel sheet metal formed to a tubular shape having overlapping ends as shown in FIG. 6. Flanges 40 on these ends are drawn together by threaded fasteners 42 thereby to secure draw band 39 to the distal end of tube leg 21 and the stub fitting an eductor 17 as shown.

Closed burner 11a is preferably cylindrical with the section 33a of pipe 33 being straight and disposed tangentially of burner 11a. In flow of air therefore forms a cylindrical vortex or helical path in proceeding through the burner 11a about the flame and the radiant tube 25.

In FIG. 3 air inlet pipe 35 and air outlet pipe 33 are connected by a U-shaped conduit portion 34 of, for example, 0.093 inch diameter stainless steel tubing. These pipes 33 and 35 pass through clearance openings 36 and 38, respectively, in draw band 39. The air flowing in this U-shaped portion 34 is diverted along generally parallel oppositely directed paths into the furnace chamber and then back out of the furnace chamber so that hot exhaust gases flowing from the furnace chamber in exhaust leg 21 heat the U-shaped portion 34 and therefore also the incoming air to be supplied to the burner. This transfer of heat lowers the temperature of the exhaust gases and reduces the quantity of fuel required to raise the temperature of the air being supplied to the burner end of the radiant tube. Thus, the U-shaped portion 34 of the air intake passageway functions as a heat recuperator. Several features illustrated in FIGS. 3, 4 and 5 significantly improve the transfer of heat from the exhaust gases to the incoming combustion air.

The free end 41 of the U-shaped conduit portion 34 extends beyond the inner furnace wall 29 and into the furnace chamber and absorbs radiation from the radiant tube 21 as well as receiving heat from the exhaust gases passing thereby. In the region of the wall 27, there are interleaved a plurality of baffles such as 43, 45 and 47 for inducing a serpentine pattern of exhaust gas flow in that region to enhance heat transfer from the exhaust gas to the intake air flowing in legs 49 and 51 of the U-shaped conduit portion. The interleaving of these baffles not only swirls the exhaust gas to increase heat transfer from that exhaust gas to the legs 49 and 51 but also substantially closes off the straight line paths from the radiant tube section lying in the furnace chamber 31 to portions of the system lying outside the furnace wall 27 so as to minimize radiant losses through the exhaust end of the radiant tube.

When the furnace system has been shut down for a substantial period of time, all parts are at ambient temperature; however, when the furnace system is operating with incoming relatively cool air passing through line 35 and preheated combustion air being supplied by way of line 33 to the burner, the U-shaped conduit portion 34 has a substantial temperature differential across it. This temperature differential induces distortions in the U-shaped conduit portion 34 and to reduce the likelihood of damage associated with such thermal expansions, the U-shaped conduit portion 34 is coupled to the system in a free floating manner. The interleaved baffles 45, 45 and 47 are affixed as by welding to one leg of the U-shaped portion only. Thus, baffle 47 is attached to leg 51 as is baffle 53, while baffle 45 is affixed to leg 49 only. The entire U-shaped portion and its associated baffles slides freely into the exhaust leg 21 of the radiant tube and the inlet and outlet lines 33 and 35, which may be termed entrance and exit ends, respectively, pass freely through the draw band 39. The U-shape of portion 34 permits entrance and exit ends 33, 35 to flex in relation to each other since the only transverse connection therebetween is the short cross pipe at the extreme end 41. These ends 33, 35 pass through clearance holes in the sheet metal of the draw band 39. Thus, ends 33, 35 can flex not only relative to each other but also to the radiant tube 15, 21 in response to temperature changes of said U-shaped portion. With this free floating arrangement, damage due to thermal expansions is avoided. Also, installation is greatly simplified.

Referring specifically to FIG. 3, further improvement in heat transfer from the exhaust gases to the incoming combustion air may be achieved by providing one or more relatively thin long strips of metal such as 53 and 55 which are twisted about a longitudinal axis in a generally helical configuration and located within the conduit legs 49 and 51 to receive radiant energy from the conduit surfaces and to increase the turbulence of air flow in the conduit. With this arrangement, the preheated air in conduit 33 may be on the order of 800° to 1000° F. rather than being at room temperature as in the open ended radiant tube systems thereby substantially reducing the amount of fuel required to raise the temperature of the combustion air and substantially improving the overall efficiency of the system.

In summary then, convection losses from the system during times that no flame is present in the radiant tube are minimized in the present closed end configuration by preventing room air from freely entering during the "off" cycle of the burner. Radiation losses from the tube ends are radically reduced by providing a radiation reflective surface at the burner end of the tube and by providing the radiation blocking baffles at the exhaust end of the tube. Heat transfer from the exhaust gases to incoming air is facilitated by the U-shaped conduit portion extending into the exhaust end in conjunction with the associated baffles and radiant energy receiving helical cores in the conduit portion 34 and overall burner efficiency is improved by the heat recuperating concept of the present invention. Further, when operating as a closed system, the fuel-air mixture may be optimized at all furnace temperatures further contributing to the efficiency of the system, because the fuel-air ratio is established by regulating these two gases thru fixed orifices to which the gases are supplied at constant pressures and constant temperatures. Free floating construction of the heat recuperator obviates temperature differential induced damage and simplifies and facilitates installation.

In a working embodiment, typical dimensions of some of the components are as listed in the following, then being given by way of example only and not limitations.

|  | Range (In Inches) | Specific Embodiment (In Inches) |
|---|---|---|
| Length of U-shaped portion | 20–35 | 28 |
| Inside Diameter of Legs 49, 51 | 1.0–2.0 | 1.25 |
| Inside Diameter of radiant tube 25 | 3–7 | 5 |
| Outside diameter of disc portion of baffles 43, et. | 2.9–6.9 | 4.9 |

While the preceding deals primarily with a closed burner system employing an eductor, it should be noted that the recuperator can be used also with a positive pressure burner. Use of the eductor creates a negative pressure within the radiant tube as previously explained.

Without an eductor, a chimney-like piece is substituted, which may resemble a pipe elbow from which exhaust gases flow: air under pressure is fed to the burner thereby to support combustion and to create unidirectional flow of combustion products through the radiant tube. In both types of systems, the recuperator can serve in preheating the air fed to the burner.

From the foregoing, it is now apparent that a novel heat recuperating radiant tube type fuel burner system of the negative pressure type, as well as a novel approach to improving fuel burner system efficiency, has been disclosed meeting the objects and advantageous features set out hereinbefore as well as others and that modifications as to the precise configurations, shapes and details may be made by those having ordinary skill in the art without departing from the spirit of the invention or the scope thereof as set out by the claims which follow.

What is claimed is:

1. In a radiant tube type fuel burner system having a burner unit near one tube end for introducing a combustible fuel-air mixture into the tube, an arrangement for recovering heat from exhaust gas emanating from another end of the tube comprising an air intake passageway for supplying air from the atmosphere to the burner unit including a U-shaped conduit portion extending inwardly into the radiant tube from said other end of the tube to divert intake air along generally parallel oppositely directed paths into and out of the radiant tube to transfer heat from exhaust gas to intake air, entrance and exit ends on said U-shaped portion, and means for mounting said ends for movement relative to said radiant tube as may be caused by changes in temperature of said U-shaped portion.

2. The arrangement of claim 1 wherein a negative pressure is created within the tube by an eductor assembly connected to said other end of the tube, said U-shaped conduit portion being disposed upstream from said eductor such that exhaust gas passes thereby prior to entering the eductor assembly.

3. The arrangement of claim 1 wherein the radiant tube is generally U-shaped between said ends and extends through a furnace wall with a portion of the U-shaped conduit portion positioned inside the interior surface of the wall within a furnace chamber.

4. The arrangement of claim 3 further comprising a plurality of baffles within the radiant tube in a region where the radiant tube and the U-shaped conduit portions pass through a furnace wall to induce a serpentine pattern of exhaust gas flow in that region and enhance the transfer of heat from the exhaust gas to the intake air, said baffles extending transversely to the longitudinal axis of the radiant tube within which said U-shaped portion resides.

5. The arrangement of claim 4 wherein the baffles are fastened to the conduit portion only and having a sliding fit with said radiant tube thereby to avoid stress from being imparted thereto due to thermal expansion.

6. The arrangement of claim 1 further comprising at least one relatively thin long strip of metal twisted about a longitudinal axis and positioned within the conduit to receive radiant energy from the conduit and to increase the turbulence of the airflow in the conduit thereby improving heat transfer to the intake air.

7. The arrangement of claim 1 wherein the conduit portion is coupled to the system in a free floating manner to reduce the likelihood of damage due to temperature differential induced distortions and to facilitate installation.

8. The arrangement of claim 1 further comprising a plurality of interleaved baffles along the conduit portion near said other end of the tube for enhancing heat transfer from exhaust gas to intake air and reducing radiation heat loss from the system through said another end.

9. The method of reducing heat loss from a radiant tube type fuel burner system having a burner unit near one tube end for introducing a combustible fuel-air mixture into the tube comprising the steps of: transferring heat from exhaust gas within the tube to combustion air to be supplied to the burner; and reflecting radiation heat loss from the system through the tube ends.

10. The method of claim 9 including the further step of restricting air movement through the tube whenever a flame is not present in the tube.

11. The method of claim 9 wherein the step of blocking radiation loss includes providing straight line path interrupting baffles in the tube intermediate high temperature and low temperature regions of the tube.

12. The method of claim 9 wherein the step of blocking radiation loss includes closing the said one tube end and reflecting radiant energy propagating along the tube toward said one end back along the tube away from said one end.

13. In a negative pressure type radiant tube a fuel burner system having a burner unit near one tube end for introducing a combustible fuel-air mixture into the tube and an eductor assembly near another end of the tube for extracting exhaust gas from the tube while maintaining the pressure within the tube below the ambient pressure, the improvement comprising a heat recuperator exposed to exhaust gas flow within the tube intermediate the burner unit and eductor assembly for transferring heat from exhaust gas to air to be supplied to the burner, the portion of the heat recuperator exposed to exhaust gas flow comprising a U-shaped conduit portion through which air to be supplied to the burner flows, the conduit portion being disposed within the tube near said other end, entrance and exit ends on said U-shaped portion, and means for mounting said ends for movement relative to said radiant tube as may be caused by changes in temperature of said U-shaped portion.

14. The improvement of claim 13 wherein the radiant tube is generally U-shaped between said ends and extends through a furnace wall with a substantial portion of the U-shaped portion positioned inside the interior surface of the wall within a furnace chamber.

15. The improvement of claim 14 further comprising a plurality of baffles within the radiant tube to induce a serpentine pattern of exhaust gas flow in that region and enhance the transfer of heat from the exhaust gas to the air to be supplied to the burner.

16. The improvement of claim 13 further comprising at least one relatively thin long strip of metal twisted about a longitudinal axis and positioned within the U-shaped heat recuperator to receive radiant energy from the surface of the recuperator and to increase the turbulence of air passing through the recuperator to be supplied to the burner thereby improving heat transfer to the air.

17. The improvement of claim 13 wherein the heat recuperator is coupled to the system in a free floating manner to reduce the likelihood of damage due to temperature differential induced distortions and to facilitate installation.

18. The improvement of claim 13 further comprising a plurality of interleaved baffles along the heat recuperator near said other end of the radiant tube for enhancing heat transfer from exhaust gas to the air to be supplied to the burner and reducing radiation heat loss from the system through said other end.

* * * * *